United States Patent [19]

Goranson et al.

[11] 4,061,917

[45] Dec. 6, 1977

[54] BOLOMETER

[76] Inventors: Rex W. Goranson, Star Rt. Box 14, Placitas, N. Mex. 87043; Raymond V. Wick, 10421 Karen NE., Albuquerque, N. Mex. 87111

[21] Appl. No.: 688,970

[22] Filed: May 24, 1976

[51] Int. Cl.$^2$ .............................................. G01T 1/24
[52] U.S. Cl. .................................. 250/338; 250/336; 250/340; 250/370
[58] Field of Search ................ 250/336, 338, 340, 370

[56] References Cited

U.S. PATENT DOCUMENTS

| 2,516,873 | 8/1950 | Havens et al. | 250/338 X |
| 2,587,674 | 3/1952 | Aiken | 250/338 X |
| 3,699,345 | 10/1972 | Parkin | 250/336 X |
| 3,813,550 | 5/1974 | Abrams et al. | 250/338 |
| 3,898,605 | 8/1975 | Burns | 250/338 X |

Primary Examiner—Archie R. Borchelt

[57] ABSTRACT

A bolometer for the detection of radiation includes a thin film of bismuth having electrical contacts formed at its outer boundary edge whereby electrical signals, as a function of the X and Y positions of input radiation, appear as output signals at the contacts. A measure of the radiant energy striking the detector is used to ratio X and Y to make the instrument insensitive to changes in power input.

9 Claims, 5 Drawing Figures

BOLOMETER

BACKGROUND OF THE INVENTION

1. FIELD OF THE INVENTION

This invention relates to the detection of radiation and more specifically to the detection of radiant energy in the infrared range of the electromagnetic spectrum. Still more specifically, it relates to a means and method for the detection of radiant energy wherein the position of the input energy is determined relative to fixed coordinates or points of reference.

Yet still more specifically, the invention relates to a bolometer having a thin film of metal on a heat conducting material and having contacts formed on the metal film to serve as voltage output terminals to provide the X and Y positions of incident radiant energy. Thus, if D.C. voltages are applied to the contacts in current balanced relationship, one with another, and a pencil of incident radiation is directed to the film of metal, the incident radiation changes the electrical resistance of that portion of the film receiving the radiation and the current relationship is unbalanced resulting in signals yielding voltmeter responses which are calibrated with respect to X and Y coordinates. The signals are also added to yield a measure of the radiant energy striking the detector to make the instrument insensitive to power input changes.

2. DESCRIPTION OF THE PRIOR ART

Instruments for measuring radiant energy are well known and the development of powerful lasers has generated interest in radiant energy measurement and control. Some devices use semiconductor material, and some depend on establishing a temperature gradient in a thin metal film. Various other types such as photodetectors, photovoltaic detectors and pyroelectric detectors have been used to detect radiation. We are aware of U.S. Pat. No. 3,781,748 which discloses a glass type bolometer used to detect radiation through absorption of radiation incident on the glass. The glass changes it conductivity and enables measurement of the radiation. We are also aware of the below listed United States Patents 3,487,223. This patent reveals a silicon detector wherein its inherent efficiency is improved by sandblasting the reflective surface of the apparatus.

3,813,550. This patent shows a pyroelectric detector having a crystalline body using damping to increase the frequency response.

3,851,174, discloses a detector comprising a metal film of molybdenum or tungsten and an insulating substrate to establish a thermal gradient.

3,898,605, illustrates an optical bolometer forming a portion of a waveguide to measure the radiation which travels parallel to the detector element.

There are no known metallic detectors of radiant energy which operate to provide X and Y positions of the input radiation relative to fixed coordinates. The behavior of our metallic film detector yields an electrical output when calibrated against position.

SUMMARY OF THE INVENTION

The present invention describes an apparatus which is sensitive to radiation and more particularly infrared radiation and is so constructed and arranged that it can measure the position of input radiation with respect to fixed coordinates.

It is one object of the invention therefore to provide an improved radiation detector.

It is another object to provide a position sensing detector.

It is yet another object of the invention to provide a bismuth bolometer which will sense the position of input radiation and a measure of the input power.

It is yet still another object of the invention to provide a bismuth bolometer which will generate electrical signals as a function of the X, Y and Z axes of input radiation.

These and other advantages, features and objects of the invention will become apparent from the following description taken in connection with the drawings.

DETAILED DESCRIPTION OF THE PREFERRED EMBODIMENTS

Figure 1:
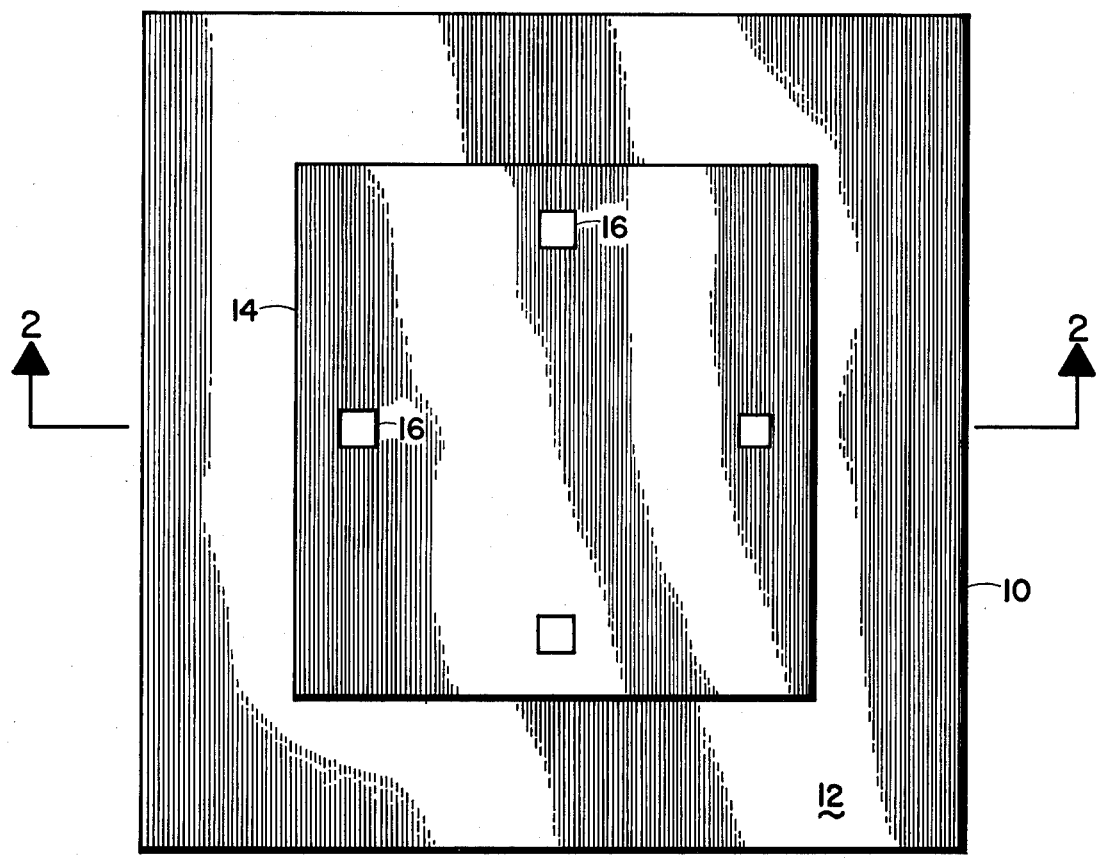
FIG. 1 is a top plan view of the improved bolometer.

Referring now to the drawing there is shown in FIG. 1, for illustrative purposes, a top plan view of the bolometer of the invention. A thin layer of bismuth is shown by reference character 14 which is, or can be, vapor deposited on a substrate 10 and which is in the order of 100–1000 A in thickness.

Contacts 16 are formed near the outer periphery of the bismuth layer for connection of the bolometer into a circuit. A substrate 10 supports the bismuth layer and is of a heat conducting material. In the preferred embodiment, the substrate is aluminum upon which a mirror-like surface is provided and an aluminum oxide dielectric coating 12 is sandwiched between the bismuth and the aluminum.

Those skilled in the art, once the invention has been disclosed, can discover other and different materials for the substrate, however, it has been found that the substrate as described above is a combination to obtain the frequency response and the responsivity needed for the adroit operation of the detector.

The detector operates on the basis of change of conductivity in the sensor as a function of the temperature rise caused by the incidence of radiant energy. The substrate described above acts as a heat sink to prevent overheating of the bismuth layer.

Figure 2:
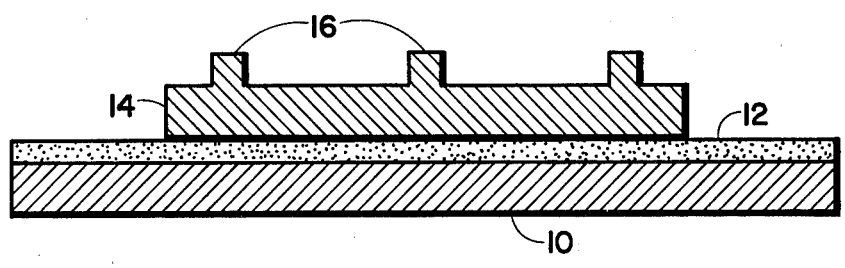
FIG. 2 is a cross sectional view of the device of the present invention.
Figure 3:
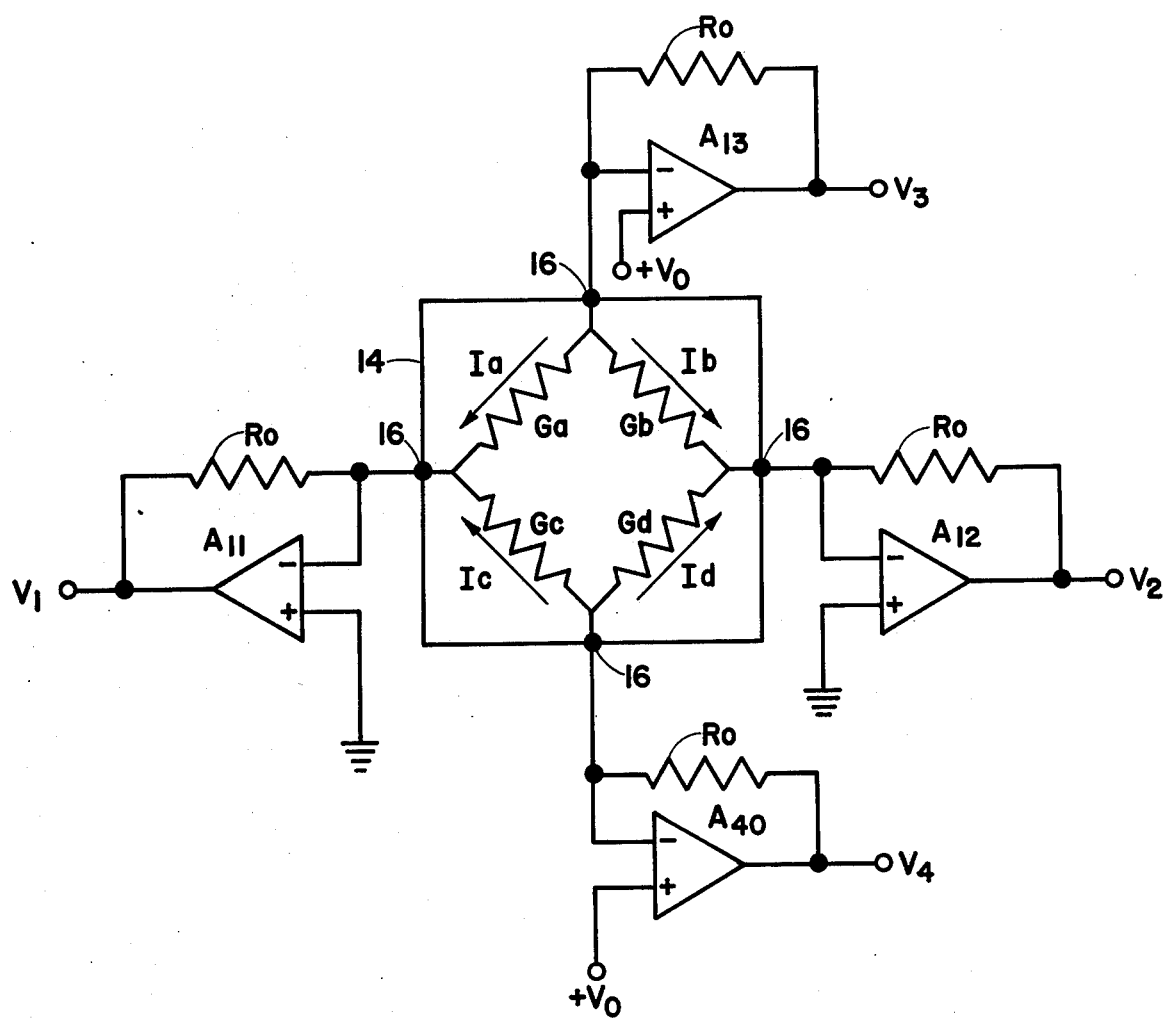
FIG. 3 shows a circuit which can be used for calibrating the sensor.

Referring to FIG. 3 which is a schematic wiring diagram showing the setting of the invention, reference character 14 designates, generally, the sensor described in FIGS. 1 and 2. The sensor as connected is sensitive to infrared radiation, from the visible to beyond 10.6 μm, and is configured so that it outputs linear X-Y coordinates of the power centroid of a laser beam striking its surface. The difference in outputs of opposing pairs of terminals 16 is proportional to the X and Y coordinates of the sensor. The total incident power reading may be linearly obtained from bolometer outputs. This signal (Z axis output) is used in a ratioing circuit (not shown) to render the position measurements insensitive to variations in laser power. A reference detector, blocked from the laser beam (not shown) can be used to stabilize the Z axis output against changes in sensor and ambient temperature.

As illustrated in the diagram of FIG. 3, the bismuth detector 14 can be represented as an equivalent circuit of four conductances $G_a$, $G_b$, $G_c$ and $G_d$. Amplifiers $A_{13}$ and $A_{40}$ provide detector bias current. The current flows through the feedback resistors ($R_0$) of $A_{13}$ and $A_{40}$ so that the amplifier output voltage is proportional to detector current. Amplifiers $A_{11}$ and $A_{12}$ receive the detector current and, since the current flows through their feedback resistors, the outputs of $A_{11}$ and $A_{12}$ are proportional to detector current. The current in each leg of the detector is represented by reference characters $I_a$, $I_b$, $I_c$ and $I_d$.

Writing the expressions for amplifier output gives:
$$V_1 = -R_0(I_a + I_c)$$
$$V_2 = -R_0(I_b + I_d)$$
$$V_3 = V_0 + R_0(I_a + I_b)$$
$$V_4 = V_0 + R_0(I_c + I_d)$$

The reference voltage ($V_0$) may be on the order of five volts, sufficient to supply the detector with 70 to 80 mA total bias current.

Then:
$$V_1 - V_2 = R_0(I_b + I_d - I_a - I_c) - \text{(X axis)}$$
$$V_3 - V_4 = R_0(I_a + I_b - I_c - I_d) - \text{(Y axis)}$$
$$V_1 + V_2 = R_0(I_a + I_b + I_c + I_d) - \text{(Z axis)}$$

The current in each leg is equal to the conductance of the leg (G) times the reference voltage ($V_0$).
$$I_a = G_a V_0$$
$$I_b = G_b V_0$$
$$I_c = G_c V_0$$
$$I_d = G_d V_0$$

so that:
$$V_x = V_1 - V_2 = R_0 V_0 (G_b + G_d - G_a - G_c) - \text{(X axis)}$$
$$V_y = V_3 - V_4 = R_0 V_0 (G_a + G_b - G_c - G_d) - \text{(Y axis)}$$
$$V_z = V_1 + V_2 = R_0 V_0 (G_a + G_b + G_c + G_d) - \text{(Z axis)}$$

The voltage $V_x$ representing the X axis is proportional to the parallel conductance of legs B and D minus the parallel conductance of legs A and C. In the same manner the voltage $V_y$ representing the Y axis is proportional to the parallel conductance of legs A and B minus the parallel conductance of legs C and D. The voltage $V_z$ is proportional to the parallel conductance of all of the legs and is a measure of the radiant energy striking the detector. This signal is used to ratio X and Y to make the instrument insensitive to changes in incoming power.

Figure 4:
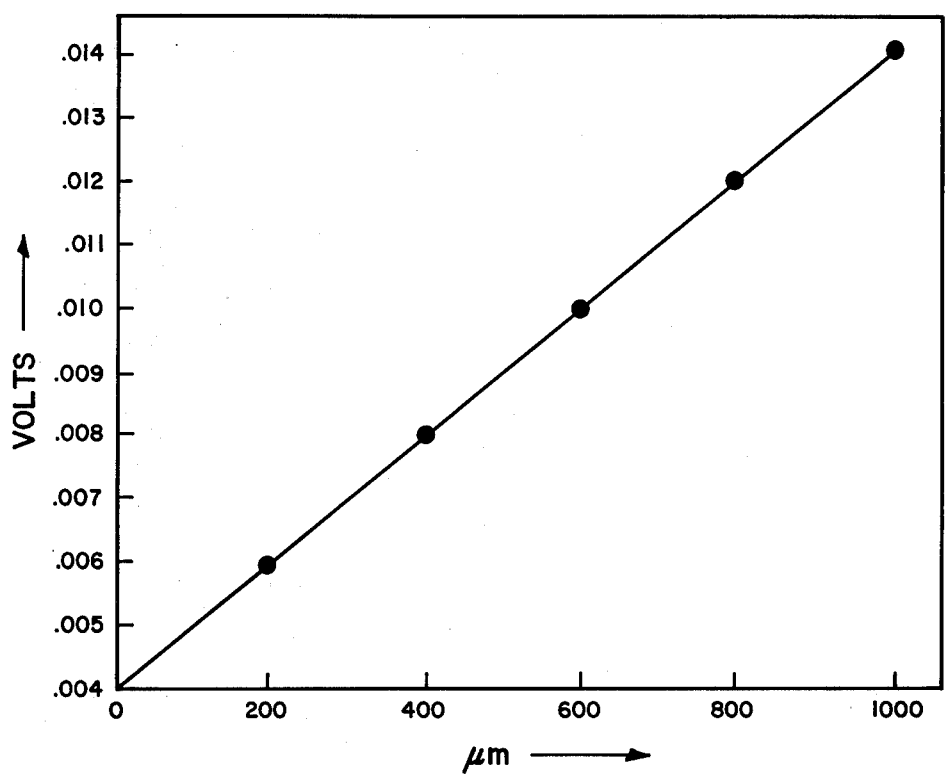
FIG. 4 shows an actual linearity plot of the output of the detector.

Referring now to FIG. 4, the linearity of this detector is shown. When volts are plotted against micrometers ($\mu m$) of surface, a straight line relationship results. The plot was obtained using a 10.6 $\mu m$ laser set to nominal 5 watts into 10X BX optics, beam size nominal 1.5 mm 1/e diameter at the detector. The bias was set to 5.6V (10.0 ma across detector). The full range of approximately 35 mV ($-5$ to $+30$ mv) indicates active linear area is approximately 3.5 mm square. The data points were taken in approximately midsensing region. The detector was aligned to give zero ($\pm.0005V$) in other axis, along any line. The same data was obtained across lines 1 mm apart from and parallel to the center line. The data was read on Darcy DVM Model 330 and Federal Dial Indicator (Metric 1.0 $\mu m$/DIV.).

Figure 5:
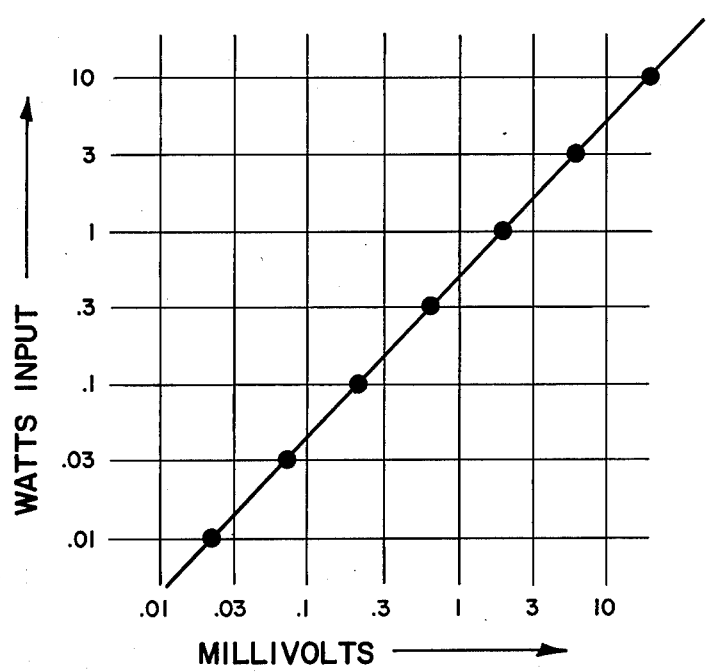
FIG. 5 shows a responsivity plot of the detector.

FIG. 5 shows the responsivity of the detector to 10.6 $\mu m$ radiation. Input watts are plotted against millivolts.

There is an apparent linear relationship over at least three decades.

The above relationships are meaningful to the design for radiant energy detection and measurement. While the invention has been shown with reference to preferred embodiments thereof, it will be understood by those skilled in the art that changes in form and detail may be made therein without departing from the spirit and scope of the invention.

What is claimed is:

1. A thin film bolometer for the detection of radiation and to provide X and Y positions of the input radiation relative to fixed coordinates and a measure of the radiation which comprises:
   A film of heat conducting material;
   A thin film of bismuth on said material;
   At least a pair of contacts formed on said film of bismuth; and
   A circuit including a source of D.C. voltage connected to said contacts to generate signals as functions of incident radiation position and a further signal which is a function of radiation intensity.

2. The bolometer according to claim 1 wherein the said film of bismuth has a thickness of about 100 to 1000A.

3. The bolometer according to claim 1 wherein the film of heat conducting material comprises aluminum having an oxide dielectric coating.

4. The bolometer according to claim 1 wherein the said film of bismuth has a thickness of about 100–1000 A and the film of heat conducting material comprises aluminum having an oxide dielectric coating between the said aluminum and the said bismuth.

5. The bolometer according to claim 4 having two pairs of contacts disposed about the outer boundary area.

6. A circuit for detecting radiation and to provide X and Y positions of the input radiation relative to fixed coordinates and to provide a measure of the radiation comprising:
   a bolometer consisting of a film of aluminum having an oxide dielectric coating and a film of bismuth of thickness about 100–1000 A on said coating;
   a plurality of contacts formed on said bismuth;
   and a plurality of feedback amplifiers having their respective outputs connected to each respective contact and their respective inputs connected to a voltage source.

7. That method of detecting radiation which comprises the steps of applying a D.C. voltage to a thin film of bismuth, exposing the film to radiation whereby the electrical resistance changes, and detecting a resultant voltage change at an output area of the bismuth film.

8. A thin film bolometer for the detection of radiation and to provide X and Y positions of the input radiation relative to fixed coordinates which comprises:
   A film of heat conducting material;
   A thin film of bismuth on said material;
   Two pairs of contacts disposed about the outer boundry of said bismuth film; and
   A circuit having two sources and two returns of D.C. voltage connected to said contacts whereby the difference voltage magnitudes of either or both pairs of contacts are a measure of the position of radiation incident to said bismuth and the voltage magnitudes at the respective outputs are rendered insensitive to the radiation quantum.

9. The invention according to claim 8 including a circuit to ratio the voltages representing the radiation position such that these voltages represent linear distances in one or more orthoginal directions.

* * * * *